United States Patent [19]

Quinonez

[11] Patent Number: 4,580,799
[45] Date of Patent: Apr. 8, 1986

[54] FOLDABLE AND CONVERTIBLE CREEPER DEVICE

[76] Inventor: Silvio C. Quinonez, 355 N. Dougherty Ave., Fort Bragg, N.C. 28307

[21] Appl. No.: 555,527

[22] Filed: Nov. 28, 1983

[51] Int. Cl.[4] .............................................. B62B 11/00
[52] U.S. Cl. .................................... 280/32.6; 280/639
[58] Field of Search ....................... 280/639, 32.6, 32.5

[56] References Cited

U.S. PATENT DOCUMENTS

| | | | |
|---|---|---|---|
| 1,098,262 | 5/1914 | Hollingshead | 280/32.6 |
| 1,195,014 | 8/1916 | Hild | 280/32.6 |
| 1,302,301 | 4/1919 | Broome | 280/32.6 |
| 1,349,941 | 8/1920 | Broome | 280/32.6 |
| 1,511,943 | 10/1924 | Bush | 280/32.6 |
| 2,332,089 | 10/1943 | Knight | 280/32.6 X |
| 2,595,783 | 5/1952 | Griffin | 280/32.6 |
| 3,677,569 | 7/1972 | Larson | 280/32.6 |

FOREIGN PATENT DOCUMENTS 283330  1/1928  United Kingdom ............... 280/32.6

Primary Examiner—Joseph F. Peters, Jr.
Assistant Examiner—Everett G. Diederiks, Jr.
Attorney, Agent, or Firm—Bacon & Thomas

[57] ABSTRACT

A foldable and convertible creeper device is disclosed having two portions hinged together such that one portion may be folded over onto the other portion. In its folded position, the creeper device is compact and easy to transport. In its extended condition, in which the two portions are adjacent each other, the device provides support for a person in a generally horizontal position. Casters attached to the undersides of the portions allow the device to be readily moved by the user. A foldable seat may be attached to the underside of one of the portions, the seat being movable between folded and extended positions to enable the device to be used as a movable stool. When the device is used as a creeper, the seat is folded beneath one of the portions. When the device is to be utilized as a movable stool, the portions are folded over such that the seat is on the upper surface and then it may be placed in its extended position to support the user.

19 Claims, 10 Drawing Figures

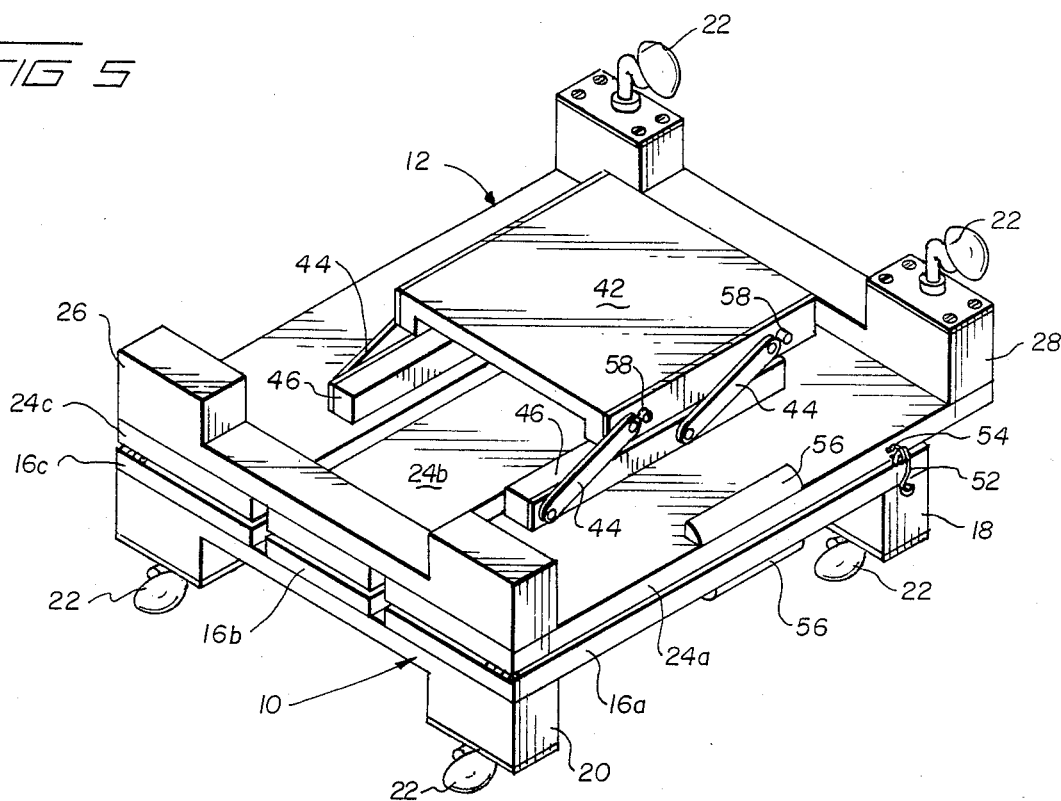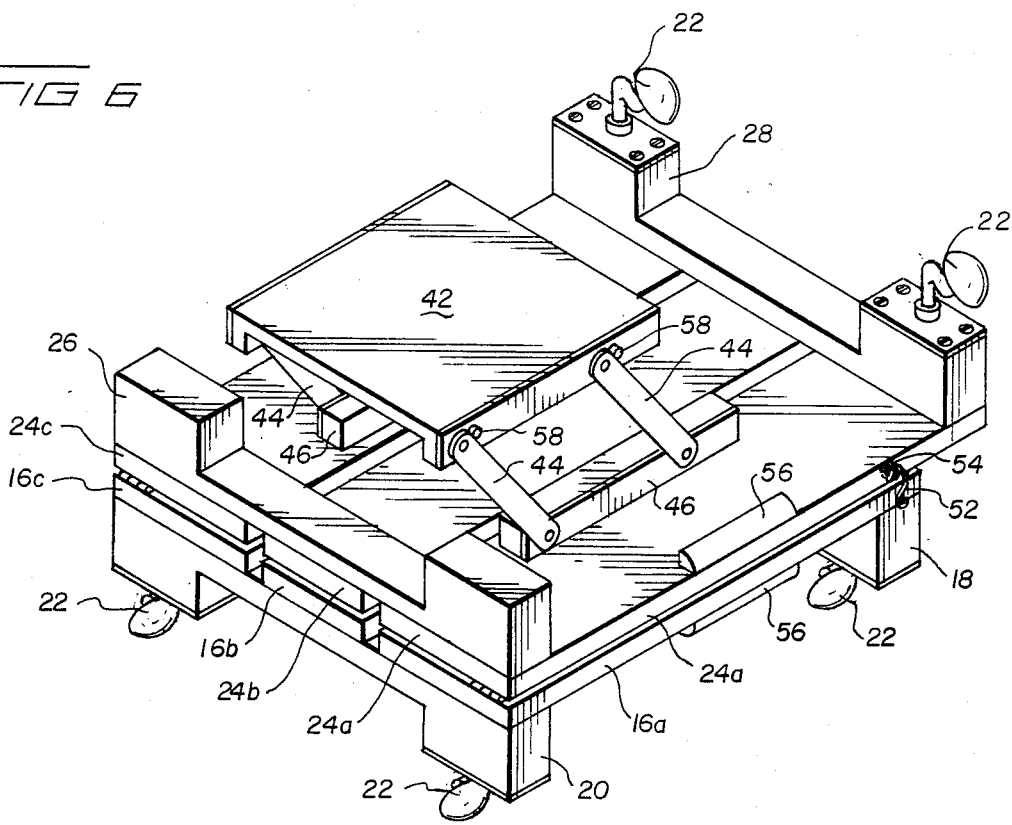

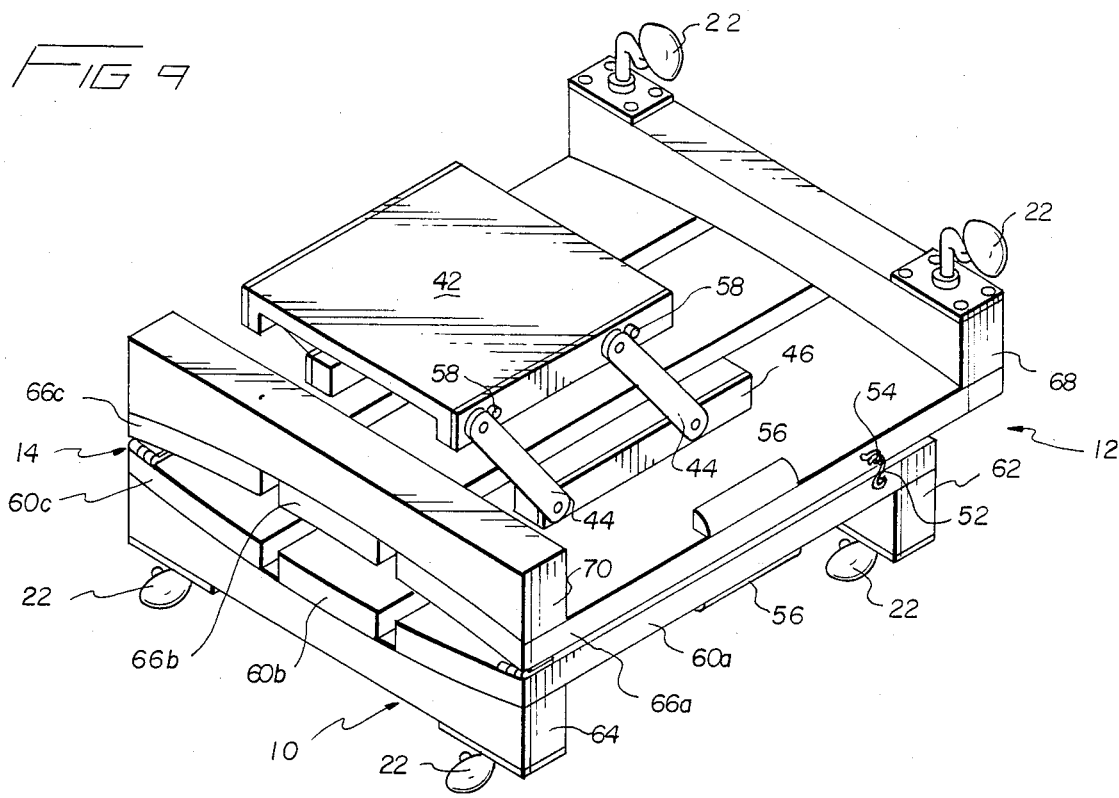
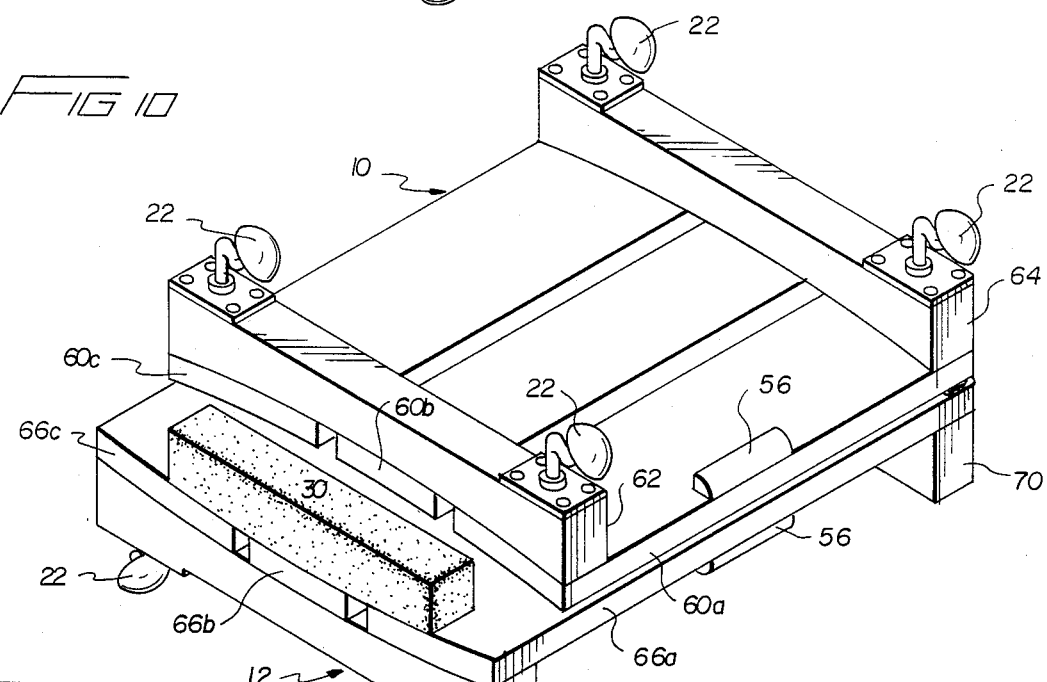
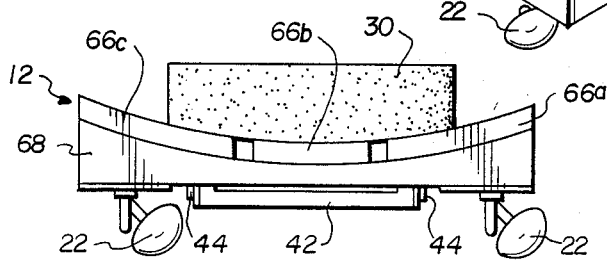
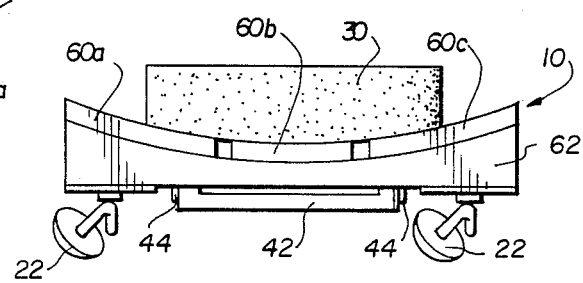

FOLDABLE AND CONVERTIBLE CREEPER DEVICE

FIELD OF THE INVENTION

The instant invention relates to a creeper device which may be folded into a compact package to facilitate transportation, and which may be converted into a movable stool.

BRIEF DESCRIPTION OF THE PRIOR ART

Devices to support a mechanic in a generally horizontal position to enable him to easily work on the underside of a vehicle, known as creepers, have been known since shortly after the invention of the automobile. In their most rudimentary form, these devices comprise a generally planar, horizontal surface having wheels attached thereto. The planar surface is of sufficient size to support the mechanic while the wheels enable him to easily maneuver the creeper to various positions beneath the vehicle. Known creepers also may have head rests mounted adjacent one end to increase the comfort for the user. It is also known to form the creeper from a plurality of smaller sections that are joined together via a hinge such that the creeper may be folded into a more compact package to facilitate storage.

It is often necessary for the artisan to perform work on the front, rear, or sides of the vehicle which is most easily performed in a seated position. Combination creepers are known wherein the creeper is convertible from its normal configuration into a stool or a chair. However, while these known devices are collapsible or folable into compact package, they do not provide for easy maneuverability when in the chair/stool configuration. In these known devices, the mechanic must physically pick up and move the stool or chair whenever it is desired to change his position. This, quite obviously, causes wasted time and effort on the part of the mechanic.

Creepers which are convertible into a stool configuration wherein casters or wheels provide maneuverability when in the stool configuration are also known, but these devices are, typically, non-foldable. Thus, these devices cannot be easily transported or stored.

SUMMARY OF THE INVENTION

The instant invention overcomes the shortcomings of the prior art devices by providng a creeper device that is not only foldable into a relatively small package to facilitate storage and transportation, but one which is also convertible into a movable stool. The device comprises first and second portions which are hingedly joined together and are movable between a first position wherein the portions are adjacent each other to provide a support surface for the mechanic, and a second position wherein the portions are folded such that one rests on top of the other. Universally movable casters are provided on the lower surfaces of each portion to facilitate maneuverability of the device. The first and second portions may have an uper surface which is either flat or concavely contoured to increase the comfort for the user.

A stool seat may be provided on the underside of one of the portions. The attaching means which attaches this seat to the respective portion allows the seat to move between a folded position, wherein it is closely adjacent the undersurface of the portion, and an extended position wherein it provides a seat for the user. In order to convert the creeper into the stool, the portion having the seat attached thereto is folded over on top of the adjacent portion. Since the seat is now facing upwardly, it may be easily moved from its folded position to its extended position and the device utilized as a stool. The casters attached to the lower portion allow the user to easily maneuver the device in this configuration.

Locking means may be provided to positively lock the portions in their extended positions as well as latching means to latch them in their folded positions. Additionally, the portions may have a carrying handle attached thereto to facilitate the transportation of the device in its folded configuration.

BRIEF DESCRIPTION OF THE DRAWINGS

FIG. 5 is a perspective view of the device in FIGS. 1-4 in its folded configuration with the seat in its folded position.

FIG. 6 is a perspective view of the device shown in FIG. 5 with the seat in its extended position.

FIG. 7 is an end view of a first end of a second embodiment of the device according to the invention.

FIG. 8 is an end view of the other end of the second embodiment of the device shown in FIG. 7.

FIG. 9 is a perspective view of the second embodiment of the device according to the invention with the seat in its extended position.

FIG. 10 is a perspective view of a third embodiment of the device according to the invention.

DETAILED DESCRIPTION OF THE PREFERRED EMBODIMENTS

Figure 1:
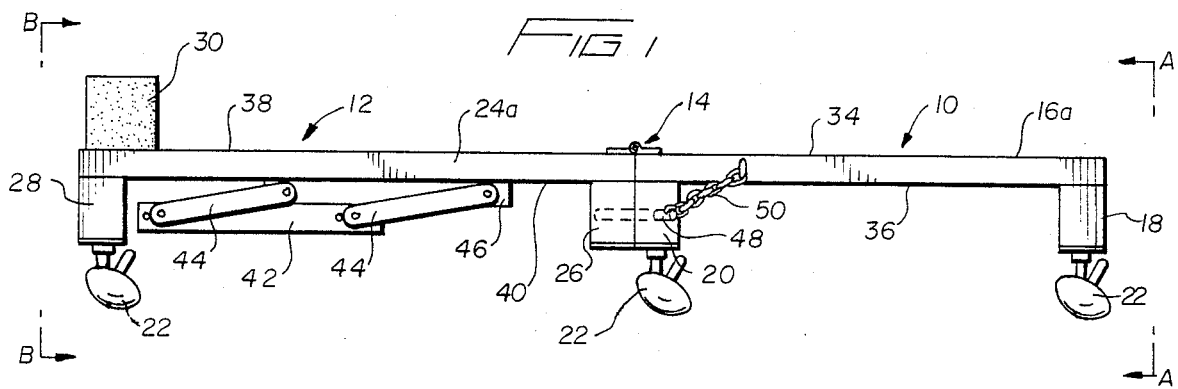
FIG. 1 is a side view of the foldable and convertible creeper according to the invention.
Figures 2, 3:
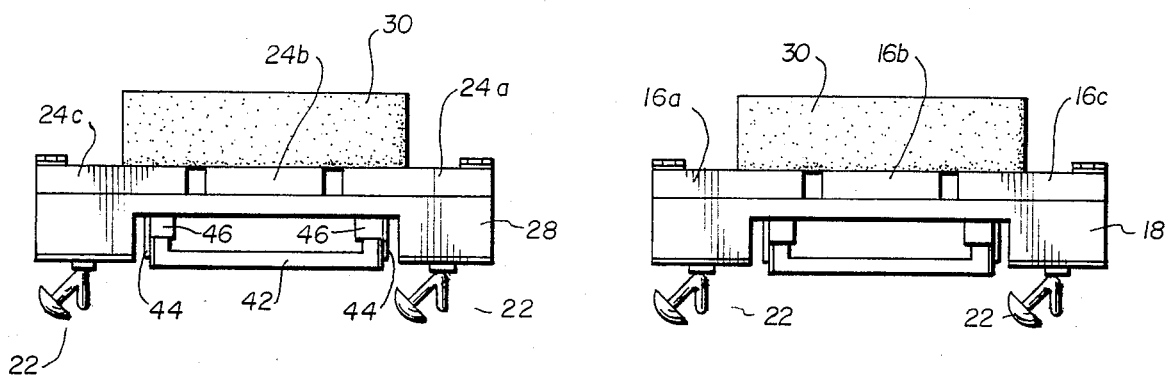
FIG. 2 is an end view of the device according to the invention viewed in the direction of arrows A—A in FIG.1.
FIG. 3 is an end view of the device according to the invention viewed in the direction of arrows B—B in FIG. 1.
Figure 4:
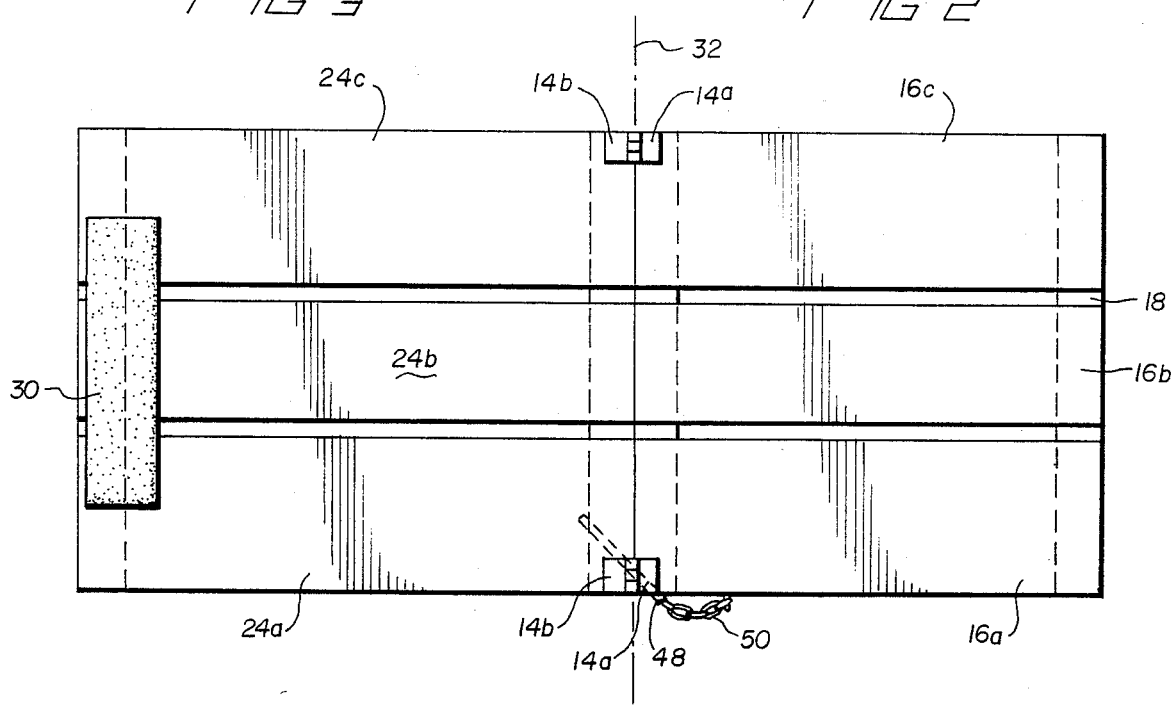
FIG. 4 is a top plan view of the device according to the invention shown in FIGS. 1-3.

The creeper device according to the invention comprises a first portion 10, a second portion 12, and hinge means 14 which connects the first and second portions together. First portion 10 may be formed of a plurality of longitudinal slats 16a, 16b, and 16c joined at their ends by cross members 18 and 20. A plurality of universally movable casters 22 may be affixed to cross members 18 and 20 by any known means.

Second portion 12 may also be formed with longitudinal members 24a, 24b, and 24c joined at their ends by cross members 26 and 28. Additional casters 22 may be affixed to cross member 28 to provide support for the distal end of second portion 12. A head rest 30 formed of a foam rubber or other resilient material may be affixed to second portion 12 to provide additional comfort for the user. Any known means may be utilized to affix headrest 30 to second portion 12.

Hinges 14 may be a standard piano-type hinge wherein interleaved components 14a and 14b are pivotally attached to each other via a pin (not shown). The pin passing through each of the components pivotally attaches first portion 10 to second portion 12 such that each of the sections may pivot with respect to the other about pivot axis 32. As can be seen, pivot axis 32 extends generally perpendicularly to the longitudinal axis of the creeper device.

The longitudinal members 16a, 16b, and 16c are coplanar and define an upper surface 34 and a lower surface 36. Similarly, elements 24a, 24b, and 24c define an upper surface 38 and a lower surface 40 on the second portion 12.

Seat 42 is attached to lower surface 40 by way of parallel links 44 having one end pivotally attached to seat 42 and their other ends pivotally attached to mounting blocks 46. The ends of the rods 44 may be pivotally attached to their respective structures via any known means, but sufficient friction should be generated by the connecting means to retain the seat 42 in its folded position against the normal pull of gravity as shown in FIG. 1.

In order for the device to function as a creeper, first portion 10 and second portion 12 are pivoted so as to lie adjacent each other as shown in FIGS. 1-4. In this orientation, upper surfaces 34 and 38 are essentially coplanar and define a surface upon which the mechanic may lie while performing his work. Casters 22 allow the device to be easily maneuvered in any direction by the user. In order to securely lock the first and second portions, cross members 20 and 26 may each define coaxially aligned holes and pin 48 may be inserted through the holes to prevent the portions from pivoting about pivot axis 32. To prevent pin 48 from becoming lost or misplaced, it may be connected to first portion 10 via a flexible member 50.

The device may be folded for storage or transportion by removing locking pin 48 and pivoting either first portion 10 or second portion 12 about pivot axis 32 such that upper surfaces 34 and 38 face each other, as shown in FIG. 5. In this particular Figure, second portion 12 has been folded over on top of first portion 10. Latching means in the form of a hook 52 and eye 54 may be provided on the first and second portions such that engagement of the hook with the eye latches the portions in their folded configuration. Although a hook and eye assembly is shown, quite obviously any other form of latching means may be utilized without exceeding the scope of this invention. Handles 56 may be attached to first portion 10 and second portion 12 to facilitate the carrying of the device in its folded configuration.

The device may also be converted into a mobile stool by folding second portion 12 over onto first portion 10 such that upper surfaces 34 and 38 face each other as shown in FIG. 5. When in this position, seat 42 may be raised to its extended position, as shown in FIG. 6, by exerting a manual force thereon such that the seat pivots around links 44. Stops 58, attached to the sides of seat 42 adjacent the connecting point with links 44, bear against the side of the links to limit the travel of the seat. Preferably, links 44 pivot past their vertical position to eliminate the possibility of the seat returning to its folded position when the user's weight is placed upon it. Casters 22 allow the device to be readily maneuvered by the user when in its stool configuration.

In order to provide increased comfort for the user, the upper surfaces 34 and 38 may be contoured in a concave curve as shown in FIGS. 7-10. In this embodiment, longitudinal members 60a, 60b, and 60c are attached to cross members 62 and 64 such that their upper surfaces define a concave surface. Similarly, the second portion has longitudinal members 66a, 66b, and 66c attached to cross members 68 and 70 such that their upper surfaces also define a concave surface. When the device is in its creeper configuration, the concave surfaces are aligned to define a concave surface curved about the longitudinal axis of the device. The headrest 30, and the seat 42 and its connections to the secnd portion in this embodiment are the same as in the embodiment previously described. Also similar to that embodiment are the locking pin, the hook and eye latching mechanism and the handles for carrying the device.

It has been found that the piano-type hinges 14 described in the previous embodiment are also capable of being utilized with the creeper having the concave surface. The hinge 14 and its associated hinge pin have sufficient resiliency to allow the curved portion 12 to be folded over onto curved portion 10 (or vice versa) such that the concave upper surfaces face each other, as shown in FIG. 9. In this configuration, seat 42 may be raised and the device utilized as a mobile stool as previously described.

The creeper device according to the invention may also be utilized without the foldable seat structure. The construction for both the flat upper surface and the concave upper surface embodiments are exactly the same as those embodiments previously described, but the seat, the attaching links, and the mounting blocks are not utilized. This embodiment, as shown in FIG. 10, provides a lightweight, compactly foldable creeper that may be easily transported or stored. The creeper having a concave upper surface without the seat structure is shown in its folded configuration in FIG. 10. The resiliency of the piano-type hinges permits the first or second portion to be folded over upon the other portion such that the concave surfaces face each other. As in the embodiment with the flat upper surface, the pivot axis 32 extends laterally across the creeper in a direction generally perpendicular to its longitudinal axis. The locking pin, the latch means, and the handles described in detail with regard to the previous embodiments, may also be utilized with this embodiment of the invention.

The foregoing descriptions of the preferred embodiments are provided for illustrative purposes only and are not to be construed as in any way limiting the invention, the scope of which is determined solely by the appended claims.

I claim:

1. A foldable creeper device for supporting a person near a supporting surface comprising:
   (a) a first portion defining a first upper surface and a first lower surface;
   (b) first caster means attached to the first lower surface to allow the first portion to be easily moved over the supporting surface;
   (c) a second portion defining a second upper surface and a second lower surface;
   (d) second caster means attached to the second lower surface;
   (e) hinge means pivotally attaching the second portion to the first portion such that in a first, extended position the second portion is adjacent to the first portion, such that the first and second upper surfaces are generally coplanar and form a surface for supporting the person, and in a second, folded position one portion is above the other portion such that the first and second upper surfaces face each other;
   (f) a headrest attached to the second upper surface of the second portion;
   (g) a seat; and, (h) attachment means attaching the seat to the second lower surface of the second portion such that the seat is normally in a folded position when the first and second portions are in their first extended positions and is movable to an extended position when the first and second portions are in their second, folded position.

2. The foldable creeper device of claim 1 wherein the hinge means defines a pivot axis that extends laterally across the creeper.

3. The foldable creeper device of claim 2 wherein the attachment means comprises a plurality of parallel links, each link having one end pivotally attached to the lower surface of the second portion and the other end pivotally attached to the seat such that the seat remains generally parallel to the second portion throughout its movement between the folded and extended positions.

4. The foldable creeper device of claim 3 further comprising locking means to lock the first and second portions in the first, extended position.

5. The foldable creeper device of claim 4 wherein the first and second portions define coaxially aligned holes and wherein the locking means comprises a pin insertable into the holes.

6. The foldable creeper device of claim 4 further comprising latching means to latch the first and second portions in their second, folded positions.

7. The foldable creeper device of claim 6 further comprising handle means to facilitate carrying the device.

8. The foldable creeper device of claim 2 wherein the first and second upper surfaces are concavely curved about a longitudinal axis of the device.

9. The foldable creeper device of claim 8 wherein the attachment means comprises a plurality of parallel links, each link having one end pivotally attached to the lower surface of the second portion and the other end pivotally attached to the seat such that the seat remains generally parallel to the second portion throughout its movement between the folded and extended positions.

10. The foldable creeper device of claim 9 further comprising locking means to lock the first and second portions in the first, extended position.

11. The foldable creeper device of claim 10 wherein the first and second portions define coaxially aligned holes and wherein the locking means comprises a pin insertable into the holes.

12. The foldable creeper device of claim 10 further comprising latching means to latch the first and second portions in their second, folded positions.

13. The foldable creeper device of claim 12 further comprising handle means to facilitate carrying the device.

14. The foldable creeper device of claim 2 wherein the first and second upper surfaces each lie in a flat plane.

15. The foldable creeper device of claim 14 wherein the attachment means comprises a plurality of parallel links, each link having one end pivotally attached to the lower surface of the second portion and the other end pivotally attached to the seat such that the seat remains generally parallel to the second portion throughout its movement between the folded and extended positions.

16. The foldable creeper device of claim 15 further comprising locking means to lock the first and second portions in the first, extended position.

17. The foldable creeper device of claim 16 wherein the first and second portions define coaxially aligned holes and wherein the locking means comprises a pin insertable into the holes.

18. The foldable creeper device of claim 17 further comprising latching means to latch the first and second portions in their second, folded positions.

19. The foldable creeper device of claim 18 further comprising handle means to facilitate carrying the device.

* * * * *